United States Patent
Man et al.

(10) Patent No.: US 9,639,382 B2
(45) Date of Patent: May 2, 2017

(54) INTERACTIVE VIEWER OF INTERMEDIATE REPRESENTATIONS OF CLIENT SIDE CODE

(71) Applicant: MICROSOFT TECHNOLOGY LICENSING, LLC., Redmond, WA (US)

(72) Inventors: Curtis Man, Seattle, WA (US); Douglas Charles Ilijev, Austin, TX (US); Brahama Giri Abhijith Chatra, Issaquah, WA (US)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 0 days.

(21) Appl. No.: 14/279,255

(22) Filed: May 15, 2014

(65) Prior Publication Data

US 2015/0331701 A1    Nov. 19, 2015

(51) Int. Cl.
*G06F 9/455*    (2006.01)
*G06F 9/44*    (2006.01)
*G06F 11/32*    (2006.01)

(52) U.S. Cl.
CPC ............ *G06F 9/45525* (2013.01); *G06F 8/75* (2013.01); *G06F 9/4552* (2013.01); *G06F 11/323* (2013.01); *G06F 9/45529* (2013.01)

(58) Field of Classification Search
CPC ... G06F 8/41–8/437; G06F 8/443–8/49; G06F 9/45516–9/45529; G06F 11/323; G06F 11/3612; G06F 11/3624; G06F 11/3628; G06F 11/3636
See application file for complete search history.

(56) References Cited

U.S. PATENT DOCUMENTS

| | | | |
|---|---|---|---|
| 5,187,789 A * | 2/1993 | O'Hair | |
| 5,987,249 A * | 11/1999 | Grossman et al. | 717/130 |
| 6,311,324 B1 * | 10/2001 | Smith et al. | 717/114 |
| 6,996,806 B2 * | 2/2006 | Bates | G06F 11/3664 714/E11.207 |
| 7,174,536 B1 * | 2/2007 | Kothari | G06F 11/3664 717/105 |

(Continued)

OTHER PUBLICATIONS

Newland, C., HotSpot profiling with JITWatch, Apr. 16, 2014, 23 pages, [retrieved on Dec. 10, 2016], Retrieved from the Internet: <URL:https://www.chrisnewland.com/images/jitwatch/HotSpot_Profiling_Using_JITWatch.pdf>.*

(Continued)

*Primary Examiner* — Geoffrey St Leger

(57) ABSTRACT

An interactive intermediate representation (IR) viewer displays a view of the intermediate representation of client side code during a just-in-time compilation of the client side code in a live environment. The interactive IR viewer allows a developer to request the intermediate representation generated during one or more of the phases of the JIT compilation of the client side code. Modifications may be made to the intermediate representation before executable code is generated. The analysis of the intermediate representation during the live environment provides a developer with insight as to how the executable code is being compiled so that improvements may be made to improve the performance of the client side code.

20 Claims, 6 Drawing Sheets

(56) References Cited

U.S. PATENT DOCUMENTS

| | | | |
|---|---|---|---|
| 7,793,275 B2 | 9/2010 | Bobrovsky et al. | |
| 7,895,580 B1* | 2/2011 | Nikolov | G06F 11/3624 717/118 |
| 8,359,586 B1* | 1/2013 | Orofino et al. | 717/152 |
| 8,443,342 B2* | 5/2013 | Rohde et al. | 717/131 |
| 8,543,907 B1* | 9/2013 | Roskind | G06F 8/443 715/234 |
| 2004/0082345 A1* | 4/2004 | Lueckhoff | G06Q 30/02 455/456.3 |
| 2007/0006197 A1* | 1/2007 | Murphy | G06F 8/43 717/151 |
| 2010/0017788 A1* | 1/2010 | Bronkhorst et al. | 717/125 |
| 2011/0271261 A1* | 11/2011 | Kantamneni | G06F 9/45516 717/146 |
| 2012/0030653 A1 | 2/2012 | Porras et al. | |
| 2012/0304044 A1 | 11/2012 | Leithead et al. | |
| 2013/0061128 A1 | 3/2013 | Lucco et al. | |
| 2013/0067441 A1* | 3/2013 | Lafreniere et al. | 717/139 |
| 2013/0097592 A1* | 4/2013 | Simitsis et al. | 717/156 |
| 2013/0111317 A1* | 5/2013 | Oliver et al. | 715/205 |
| 2013/0139137 A1 | 5/2013 | Zhao | |
| 2013/0152057 A1* | 6/2013 | Ke et al. | 717/132 |
| 2013/0159976 A1* | 6/2013 | Jazdzewski | G06F 8/443 717/126 |
| 2013/0205282 A1 | 8/2013 | Lafreniere et al. | |
| 2013/0326490 A1 | 12/2013 | Anderson et al. | |
| 2014/0304440 A1* | 10/2014 | Barr | G06F 13/4027 710/52 |
| 2015/0074653 A1* | 3/2015 | Eracar | G06F 11/22 717/129 |
| 2015/0082276 A1* | 3/2015 | Balachandran | G06F 8/30 717/112 |
| 2015/0277866 A1* | 10/2015 | Wang | G06F 13/10 717/148 |

OTHER PUBLICATIONS

Jerding, D., et al., Visualizing Interactions in Program Executions, Proceedings of the 1997 International Conference on Software Engineering, 1997, 11 pages, [retrieved on Dec. 10, 2016], Retrieved from the Internet: <URL:http://ieeexplore.ieee.org/>.*

Gal, A., et al., Incremental Dynamic Code Generation with Trace Trees, Dec. 23, 2006, 11 pages, [retrieved on Dec. 5, 2016], Retrieved from the Internet: <URL: https://www.cs.montana.edu/ross/classes/fall2009/cs550/resources/Tracemonkey-01.pdf>.*

Würthinger, Thomas, "Visualization of Java Control Flow Graphs", In Thesis of Partial Satisfaction of Bachelor of Science, Oct. 2006, 54 pages.

Duboscq, et al., "An Intermediate Representation for Speculative Optimizations in a Dynamic Compiler", In Proceedings of 7th Workshop on Virtual Machines and Intermediate Languages, Oct. 28, 2013, 10 pages.

Eddon, Guy, "Phoenix Rising", Published on: Nov. 2005, Available at: http://msdn.microsoft.com/en-us/magazine/cc163714.aspx.

Duboscq, et al., "Graal IR: An Extensible Declarative Intermediate Representation", In Proceedings of the Asia Pacific Programming Language and Compilers Work shop, Feb. 23, 2013, 9 pages.

"DRLVM Jitrino Just-in-time Compiler", Published on: Feb. 6, 2007, Available at: http://harmony.apache.org/subcomponents/drlvm/JIT.html.

Diehl, Stephen, "Implementing a JIT Compiled Language with Haskell and LLVM", Retrieved on: Feb. 6, 2014, Available at: http://www.stephendiehl.com/llvm/.

Campanoni, et al., "A Parallel Dynamic Compiler for CIL Bytecode", In Proceedings of 13th ACM SIGPLAN International Conference on Functional Programming, Apr. 2008, pp. 11-20.

Parsons, et al., "Extracting Interactions in Component-Based System", IEEE Transactions on Software Engineering, vol. 34, Issue 6, Aug. 15, 2008, 17 Pages.

"International Search Report and Written Opinion Issued in PCT Application No. PCT/US2015/030685", Mailed Date: Aug. 31, 2015, 9 Pages.

"International Preliminary Report on Patentability Issued in PCT Application No. PCT/US2015/030685", Mailed Date: Jun. 13, 2016, 6 Pages.

"International Preliminary Report on Patentability and Written Opinion Issued in PCT Application No. PCT/US2015/030685", Mailed Date: Mar. 4, 2016, 04 Pages.

* cited by examiner

DISPLAYED WEB PAGE
502

508  Function cssRule(rulestr) {
510    rulestr = rulestr.toLowerCase();
512    var retVal = null;
514    if (document.styleSheets) {
516      for (var i=0; i < document.styleSheets.length; i++) {
518        var sheet = document.styleSheets[i];
520        for (var ruleIndex=0; ruleIndex < sheet.cssRules.length; ruleIndex++) {
522          var rule=sheet.cssRules[ruleIndex];
524          if(rule.selectorText.toLowerCase()==rulestr) {
526            retVal=rule;
528            break;}}}}

Line 2:  rulestr = rulestr.toLowerCase();

532  s12    = LdMethodFld  {s16}
534  s17    = StartCall    1
536  {s18}  = ArgOut_A     s6, s17
538  s19    = CallI        s12, {s18}
540  s6     = Ld_A         s19

FIG. 5

INTERACTIVE VIEWER OF INTERMEDIATE REPRESENTATIONS OF CLIENT SIDE CODE

BACKGROUND

A web browser is an application that formats and renders an information resource obtained over a network onto a display device. The information resource may be a web page or document that includes various types of code and content, such as client side code, HTML tags, Cascading Style Sheets (CSS), HTTP headers, and so forth. The client side code is embedded in the information resource and executed on the client machine. Typically, the client side code is implemented as a script that is written in a dynamic programming language and interpreted at runtime. Portions of the client side code may be just-in-time (JIT) compiled into machine or executable code in order to increase the execution speed of the client side code. The JIT compilation of the client side code may perform optimizations aimed at increasing the efficiency of the executable code. However, the JIT compilation may not produce efficient executable code which is often difficult to detect during development of the client side code or the JIT compiler.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

An interactive intermediate representation (IR) viewer interacts with a user or developer to display the intermediate representation of client side code generated during the JIT compilation of the client side code while executing in a live environment. The interactive IR viewer allows a developer to request the intermediate representation generated during one or more phases of the JIT compilation. The developer may modify the IR which is then compiled and executed. The execution of the modified IR enables the developer to analyze the performance of the client side code and/or the JIT compiler during a live environment. This analysis provides the developer with insight that is useful for improving the client side code and/or the JIT compiler.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF DRAWINGS

FIG. 5 is a block diagram illustrating a rendered web page, along with an exemplary source code listing of the client side code and the corresponding intermediate representation of a segment of the client side code.

DETAILED DESCRIPTION

Figure 1:
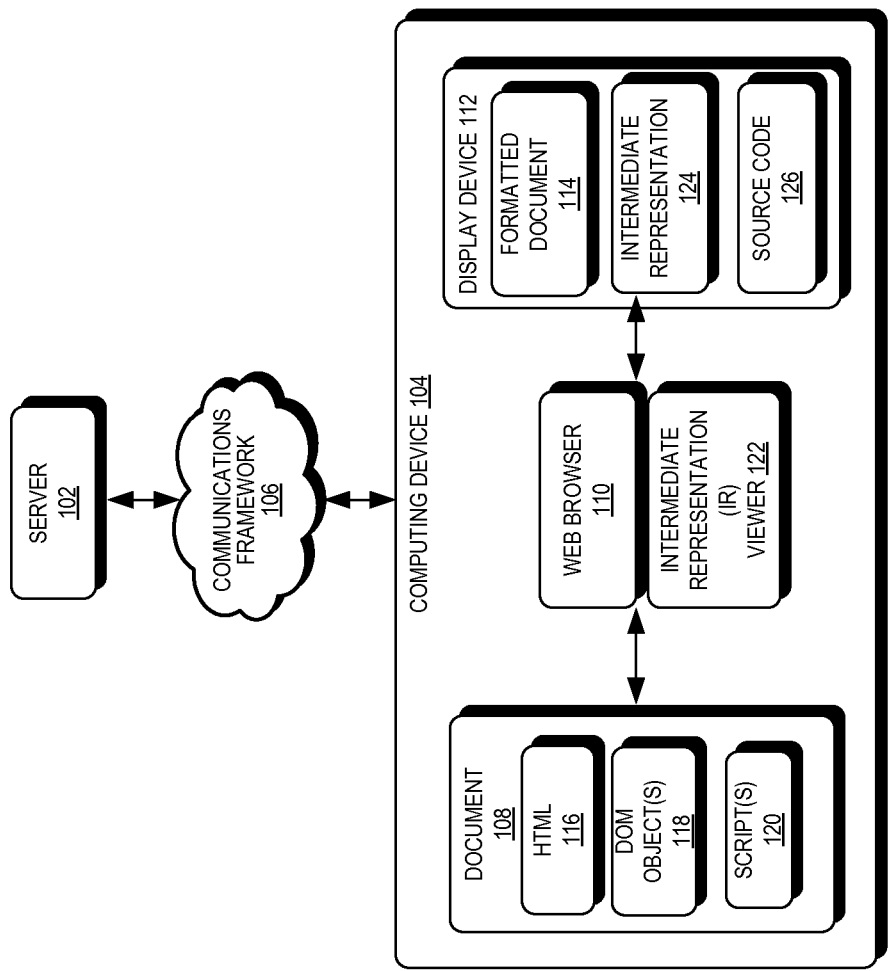
FIG. 1 illustrates an exemplary system of an interactive IR viewer.

The technology described herein pertains to an interactive intermediate representation (IR) viewer that obtains and displays a view of the intermediate representation of client side code during a just-in-time compilation of the client side code in a live environment.

Client side code is code that is sent from a server to a web browser in a client machine for execution on the client machine. Since the code executes on the client machine, it has been referred to as "client side code." The client side code is typically implemented as a script that is embedded in a web page and which is parsed, interpreted and/or compiled on the client machine at runtime. The client side code may be written in a dynamic programming language or scripting programming language (collectively referred to herein as a dynamic programming language). A dynamic programming language executes certain behaviors at runtime that a static programming language performs during compilation. For example, a dynamic programming language performs dynamic typing, code extensions, and lazy interpretation at runtime. Examples of dynamic programming languages include, without limitation, JavaScript, VBScript, AJAX, Python, and Perl.

A script written in a dynamic programming language has different and changing content during runtime based on user input. Objects expressed in such dynamic programming languages may have changing types, objects may change in shape (e.g., may have properties dynamically added), expression values may change, and/or other code factors may change dynamically during runtime. As such, scripts written in a dynamic programming language are typically interpreted and not compiled since the script content may not be known in its entirety before compile time. This results in the scripts being executed inefficiently since the interpreted code executes more slowly than the machine code that is produced from compilation.

In some cases, portions of a script may be just-in-time compiled resulting in executable machine code for that portion of the script. However, the compilation of the script code into machine code consumes a high startup cost before its execution. In order to reduce this computational burden, profile data is gathered about patterns that occur in the script. The patterns may include code that is executed relatively frequently. Once a sufficient amount of profile data is accumulated regarding the script, the profile data may be used by the compiler to generate a more efficient machine code that is optimized for faster execution. The profile data may be saved in persistent storage and accessed during subsequent executions of the script.

An intermediate representation is a language independent representation of the client side code. Compiler optimizations may be performed on the intermediate representation of the client side code. An intermediate representation may be embodied in different forms, such as without limitation, a tree representation (e.g., abstract syntax tree, parse tree, concrete syntax tree), a directed acyclic graph, bytecode, and so forth.

A live environment refers to a current execution of the client side code. The live environment may occur during execution of the client side code in a web browser, in an integrated development environment (IDE), or in any type of web application. The analysis of the IR in a live environment provides a developer with valuable insight as to how the JIT compiler is optimizing the client side code and transforming the client side code into executable code. Modifications that are made to the IR during the live environment are compiled and transformed into executable code that is subsequently executed in the live environment. This allows the developer to analyze the results of the modifications.

Attention now turns to a discussion of an exemplary system of the interactive IR viewer. FIG. 1 illustrates a block diagram of an exemplary system of the interactive IR viewer. The system 100 may include a server 102 and a computing device 104 communicatively coupled through a communications framework 106. Although the system 100 as shown in FIG. 1 has a limited number of elements in a certain topology, it may be appreciated that the system 100 may include more or less elements in alternate topologies as desired for a given implementation.

The computing device 104 and the server 106 may be any type of electronic device capable of executing programmable instructions such as, without limitation, a mobile device, a personal digital assistant, a mobile computing device, a smart phone, a cellular telephone, a handheld computer, a server, a server array or server farm, a web server, a network server, an Internet server, a work station, a mini-computer, a mainframe computer, a supercomputer, a network appliance, a web appliance, a distributed computing system, multiprocessor systems, or combination thereof. The communications framework 106 may be any type of communications link capable of facilitating communications between the computing device 104 and the server 102, utilizing any communications protocol and in any configuration, such as without limitation, a wired network, wireless network, or combination thereof. In one or more embodiments, the communications framework 106 may be embodied as the Internet.

The computing device 104 may include a document 108 retrieved from the server 102 through the communications framework 106, a web browser 110 and a display device 112. The web browser 110 is a program that retrieves the document 108 utilizing a network address, such as a uniform resource locator (URL), formats the information of the document 108, and renders the formatted document 114 on the display device 112. Examples of a web browser 110 include, without limitation, Internet Explorer®, Mozilla Firefox®, Safari®, Google® Chrome, and so forth.

The document 108 may be a web document, such as a web page, that includes code of a markup language 116, such as hypertext markup language (HTML), dynamic HTML (DHTML), extensible HTML (XHTML), extensible markup language (XML), etc. The document 108 may include document object model (DOM) objects 118 and one or more scripts 120. The DOM objects 118 include one or more objects represented in the document according to the DOM convention, which is a cross-platform and language-independent convention for representing and interacting with objects. The DOM objects 118 may include objects that are directly included in document 108 or referenced by the document 108. The scripts 120 may include code written in a dynamic programming language that enables changes made to the DOM objects 118.

An interactive IR viewer 122 may be an added component to the web browser 110 that is provided as a plug-in to the web browser 110. Alternatively, the interactive IR viewer 122 may be part of a set of plug-in or built-in tools, referred to as the F12 developer tools. These tools are software components that are added to the web browser 110 and are used to debug and/or analyze the execution of documents by the web browser 110. These tools are initiated by activation of the F12 key on the keyboard. In other embodiments, the interactive IR viewer 122 may be part of the web browser 110. The embodiments are not limited to a particular configuration of the interactive IR viewer 122.

The interactive IR viewer 122 may be a sequence of computer program instructions, that when executed by a processor, causes the processor to perform methods and/or operations in accordance with a prescribed task. The interactive IR viewer 122 may be implemented as program code, programs, procedures, module, code segments, program stacks, middleware, firmware, methods, routines, and so on. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

The display device 112 illustrates the formatted document 114 output by the web browser 110, the intermediate representation 124 of the client side code at a particular phase in the JIT compilation, and the source code 126 of the client side code. The display device 112 may be any type of electronic display, such as without limitation, a visual monitor, a television, a plasma panel, a liquid crystal display, a laser television, a touch screen, and so forth. The display device 112 may be embedded in the computing device or attached as a separate peripheral device. The embodiments are not constrained to any particular configuration of the display device.

Figure 2:
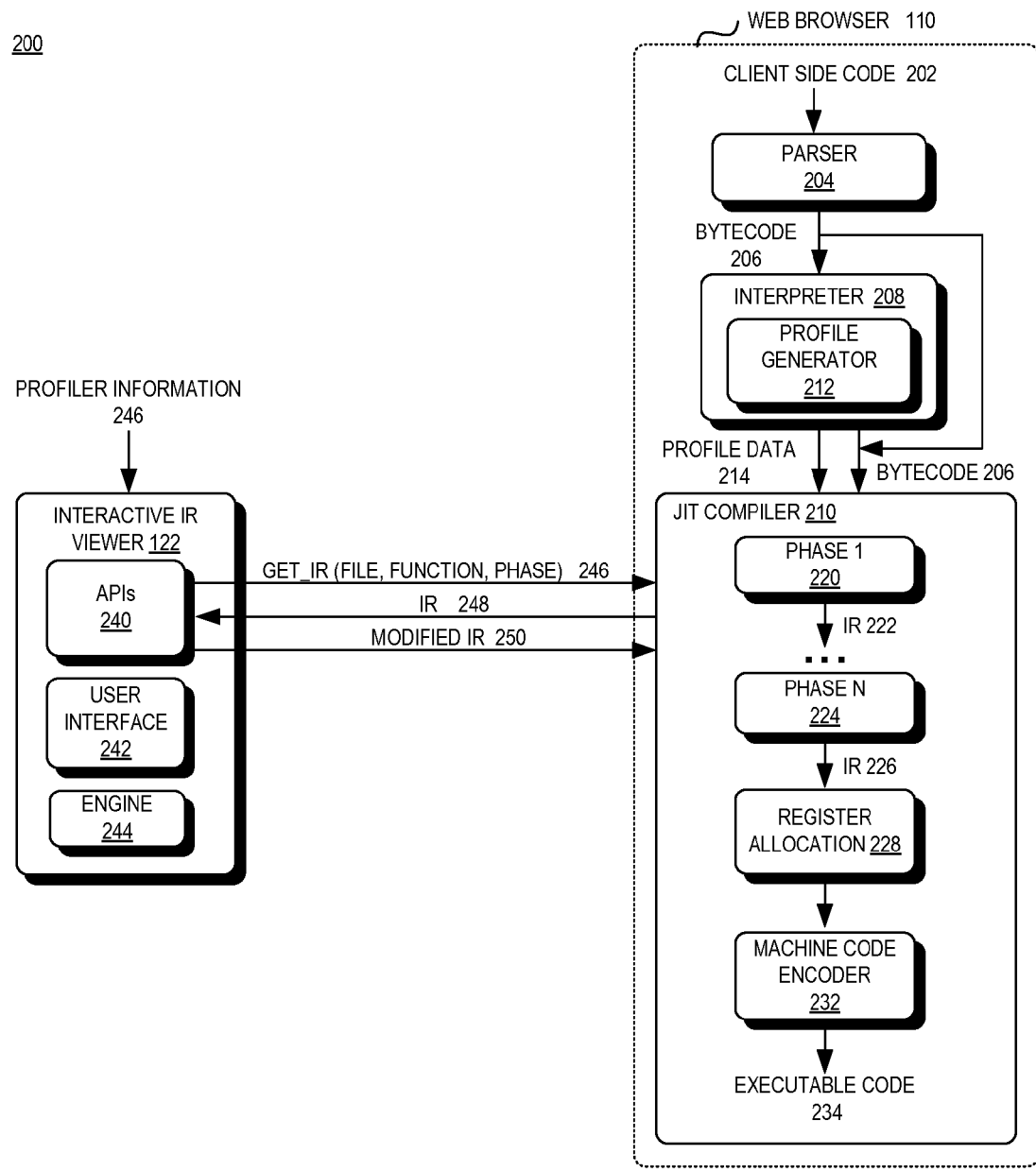
FIG. 2 is a block diagram illustrating exemplary components of the web browser and interactive IR viewer shown in FIG. 1.

Attention now turns to FIG. 2 which depicts a more detailed description of the components of the web browser 110 and the interactive IR viewer 122 that are used in the JIT compilation of the client side code. The web browser 110 receives client side code 202 that was embedded in the document 108. The web browser 110 may interpret and then JIT compile the client side code 202 to produce executable code 234. The web browser 110 may include a parser 204, an interpreter 208, and a JIT compiler 210.

The parser 204 receives the source code of the client side code 202 and performs token generation or lexical analysis so that the source code is formatted into symbols or tokens. The parser 204 can perform error checking on the tokens to determine whether expressions are formed in accordance with the grammar of the underlying programming language and to check for syntax errors. The parser 204 can output the parsed source code in any suitable form which is input to the interpreter 208. In one embodiment, the parser 204 generates bytecodes 206. A bytecode 206 includes one or more bytes of data to represent an instruction associated with a virtual machine that executes the client side code 202.

The interpreter 208 interprets the client side code 202. The interpreter 208 may be implemented as a JavaScript interpreter, a VB interpreter, a Python interpreter and so forth. The interpreter 208 may also include a profile generator 212. The profile generator 212 is configured to analyze patterns in the client side code 202 that occur multiple times, to collect statistics and further historical information regarding the client side code 202 which is used to generate profile data 214. The historical information may be used to detect the presence of frequently executed functions, loop bodies, helper calls, or property accesses found in the client side code. By indicating the presence of such patterns, the historical pattern information may be used to more efficiently execute the client side code 202 by generating executable code 234 for common occurring patterns. The output of the interpreter 208 is the profile data 214 which is forwarded to the JIT compiler 210.

The JIT compiler 210 is a "just in time" compiler since portions of the bytecodes are compiled as needed rather than being compiler prior to execution. The JIT compiler 210 utilizes the profile data 214 to determine which portions of the bytecodes are to be compiled into executable code 2340 and executed. The JIT compiler 210 performs the compilation in various phases. There may be various optimization phases (i.e., phase 1 to phase N, 220, 224) with each optimization phase generating an intermediate representation (IR 222, IR 226) resulting from the applied optimization. The optimizations may include inline optimization, global optimization, local and global common subexpression elimination, loop unrolling, and so forth. In addition, the JIT compiler 210 performs register allocation 228 and machine code encoding 232. Register allocation 228 assigns processor registers to program variables. The machine code encoding 232 generates the executable code 234.

The interactive IR viewer 122 interacts with the JIT compiler 210 to obtain the IR at a selected phase which is then displayed to the developer. The interactive IR viewer 122 may include one or more application programming interfaces (APIs) 240, a user interface 242, and an engine 244. The APIs 240 are used to interact with the JIT compiler 210 to obtain an IR of a particular feature, function and phase of the JIT compilation requested by a developer.

The user interface 242 facilitates the interaction of the developer to initiate requests for a particular IR. For example, as shown in FIG. 2, a GET_IR( ) API 246 may be used to request the IR corresponding to a particular file, function and phase of the JIT compiler 210. The requested IR 248 may be returned to the IR viewer 122 and rendered on the display device 112. The developer may modify the IR and the modified IR 250 may be transmitted to the JIT compiler 210. The modified IR may be transmitted to the JIT compiler 210 through another API call, such as the MODIFIED_IR( ) API 250. The executable code 234 resulting from the modified IR 250 and the subsequent execution of the executable code may be analyzed for performance improvements that may result from the modified IR 250.

The client side code 202 may not be contained in a single file and may include several files. Each file may include various functions, methods or other program elements that may be of interest to a developer. In order to specify the IR of an associated program element, the developer may utilize a profiler tool that generates information regarding the number of files that make up the client side code 202 and the functions, methods, classes, objects, and program elements contained in each file. This profiler information 246 may be used by the developer to select the file, function, and compilation phase that the developer uses to request an IR. The interactive IR viewer 122 may display the profiler information 246 to the developer to aid the developer in selecting a portion of the client side code.

Attention now turns to a description of further embodiments described with reference to various exemplary methods. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. The methods can be implemented using one or more hardware elements and/or software elements of the described embodiments or alternative embodiments as desired for a given set of design and performance constraints. For example, the methods may be implemented as logic (e.g., computer program instructions) for execution by a logic device (e.g., a general-purpose or specific-purpose computer).

Figure 3:
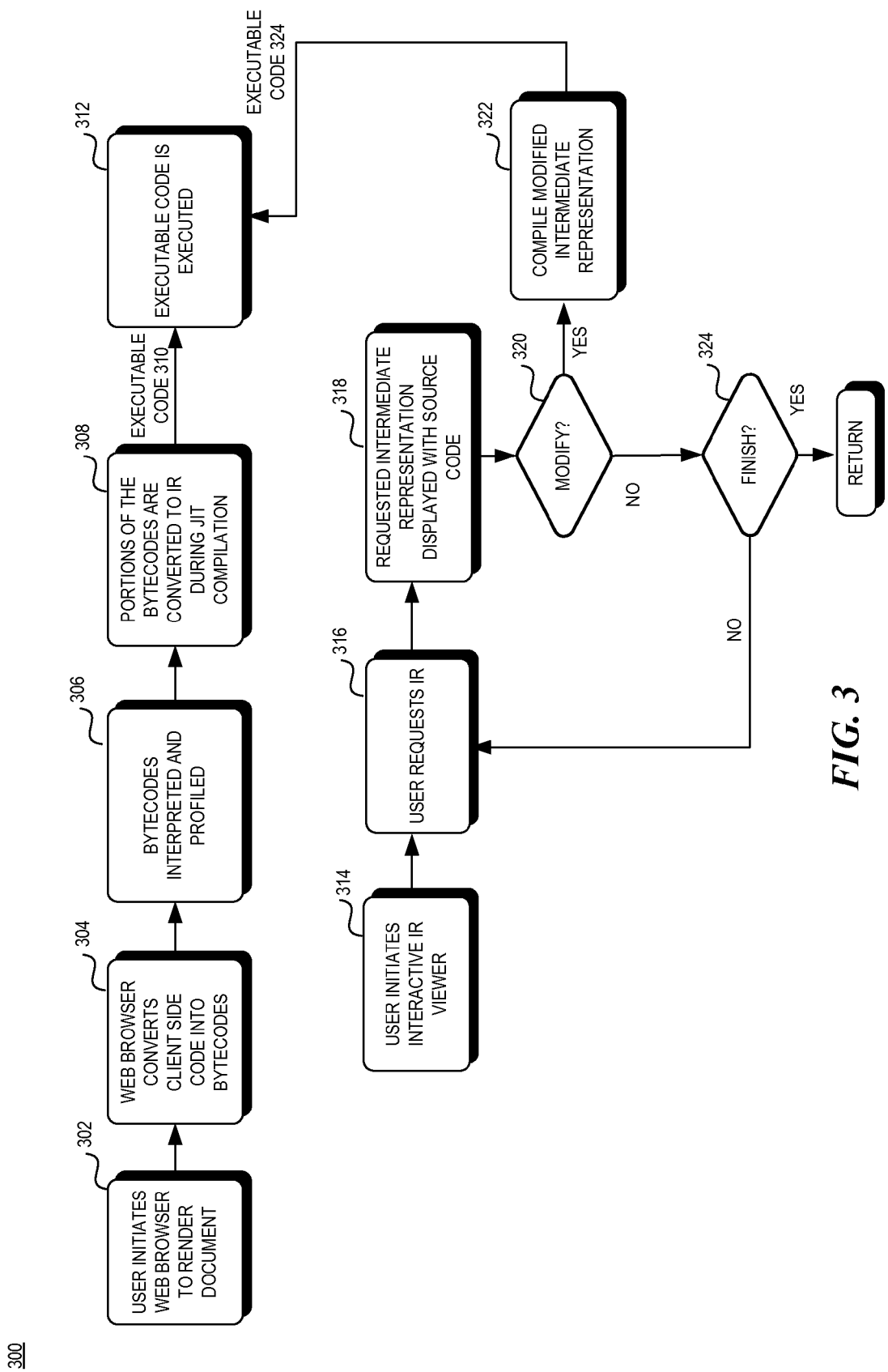
FIG. 3 is a flow diagram illustrating a first exemplary method of the interactive IR viewer.

FIG. 3 illustrates a flow diagram of an exemplary method of the interactive IR viewer. It should be noted that the method 300 may be representative of some or all of the operations executed by one or more embodiments described herein and that the method can include more or less operations than that which is described in FIG. 3. In an embodiment, the method may illustrate operations for systems 100 and 200.

FIG. 3 illustrates an exemplary method depicting the interactions of a developer with the interactive IR viewer. The method may start with a developer (e.g., user, end user, system administrator, developer, etc.) activating a web browser to render a document (block 302). The document may be retrieved over a network (e.g., Internet) with the web browser using a network address (e.g., URL) to retrieve the document. The document may be a web page that the web browser formats and renders onto a display device. The document contains client side code, such as a script (e.g., JavaScript, VB Script, etc.), that the web browser interprets and compiles. The web browser converts the source code of the script into bytecodes (block 304) which is interpreted and profiled (block 306) before being JIT compiled (block 308) into executable code 310 that is executed (block 312).

Simultaneously, as the web browser executes the client side code as described above, the developer may activate the interactive IR viewer (block 314). The interactive IR viewer may be a plug-in to the web browser, embedded within the web browser, or part of the F12 developer tools embedded within the web browser. A developer may activate the interactive IR viewer through a separate tab that is displayed on the user interface of the web browser, through a tool bar or menu, through activation of the F12 key or through any other means.

Upon activation of the interactive IR viewer, the developer may request the IR of a particular portion of the client side code (block 316). The source code of the client side code associated with the request is displayed to the user along with the corresponding IR (block 318). The selection may specify a particular file of the client side code, a function within the particular file, and a particular compilation phase.

The requested intermediate representation is obtained from the JIT compiler and displayed to the developer (block 318). The developer may modify the intermediate representation (block 320—yes). The modified intermediate representation may then be compiled (block 322) and the resulting executable code executed (block 312). The developer may choose not to modify the intermediate representation (block 320—no) and instead select another intermediate representation to view (block 320—no, block 324—no). When the user is finished with the interactive IR viewer (block 322—yes), the intermediate IR viewer finishes processing.

Figure 4:
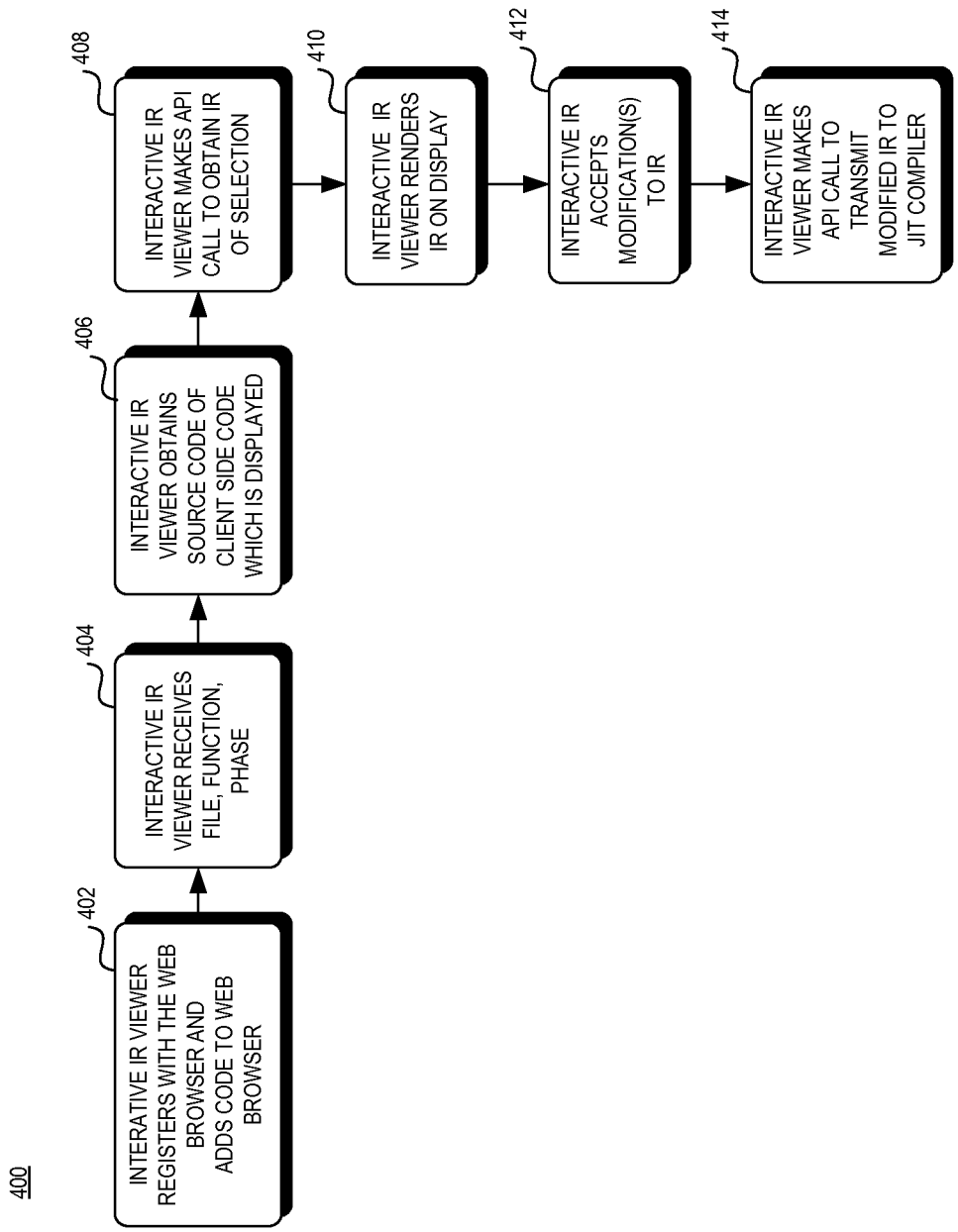
FIG. 4 is a flow diagram illustrating a second exemplary method of the interactive IR viewer.

Attention now turns FIG. 4 which illustrates another exemplary method 400 of the interactive IR viewer. It should be noted that the method 400 may be representative of some or all of the operations executed by one or more embodiments described herein and that the method can include more or less operations than that which is described in FIG. 4

In one or more embodiments, the interactive IR viewer may be a plug-in (e.g., add-on, software component, snap-in) to the web browser. In these embodiments, when the user activates the web browser, the interactive IR viewer registers itself with the web browser and establishes a protocol for exchanging data (block 402). Thereafter, the interactive IR viewer is part of the web browser. The developer may activate the interactive IR viewer through a menu option on the web browser, through a key stroke (e.g., F12), or in any other manner so desired. Once the interactive IR viewer is activated, the user interface of the interactive IR viewer is displayed. A developer uses the user interface of the interactive IR viewer to interact with the developer and to display the source code of the client side code and its intermediate representation.

As the web browser is executing the client side code embedded in a document, the developer may utilize the user interface of the interactive IR viewer to request the intermediate representation for a particular segment of the client side code. The developer may specify this segment by indicating the file, function and phase of interest to the developer (block 404). The interactive IR viewer then obtains the source code corresponding to the requested file and function which is displayed to the developer (block 406).

The interactive IR viewer then obtains the corresponding intermediate representation associated with the requested portion of the source code (block 408). The interactive IR viewer may issue one or more API calls to obtain the requested intermediate representation (block 408). The requested intermediate representation is then rendered on a display (block 410).

The developer may perform one or more actions with the intermediate representation. The developer may modify the intermediate representation by adding, deleting or changing the intermediate representation. The user interface may be used to receive the modifications to the IR (block 412). The interactive IR viewer may transmit the modified IR to the JIT compiler through one or more API calls (block 414). The JIT compiler may use the modified IR in the compilation and generate executable code that is executed by the web browser. The user may continue to make additional selections and modifications as intended.

FIG. 5 illustrates an exemplary view of the data that may be displayed by the interactive IR viewer. A web browser may display a view of a displayed web page 502 and the interactive IR viewer may display a view of the source code of the client side code 504 and a view of the displayed IR 506. Each view 502, 504, 506 may be displayed in a separate window, in a separate portion of the same window, or separately without the other views. The embodiments are not constrained to any particular layout of the displayed views.

In this example, the web page may include script code that includes the function, cssRule. The function cssRule finds the rule that is associated with the input string, rulestr. The function includes eleven lines of code, 508-528. Line 222 converts the input string, rulestr, to all lower case characters. The variable, retVal is set to null in line 512. Line 514 checks if style sheets exist and then searches for the associated rule. The outer loop, lines 516 to 528, search each style sheet associated with a set of documents and the inner loop, lines 520-528, searches a style sheet for the rule that corresponds to the input string, rulestr.

In this example, the developer requested the IR for line 2 of the function cssRule after a particular phase of the JIT compilation. The IR is shown in view 506. Each line of the IR includes an instruction. In this example, the instruction includes a symbol and an operation that generates a value that is associated with the symbol. For example, line 532 shows the symbol, s12, set to the result of the LdMethodFld operation performed using the contents of the symbol {s16}. Line 534 shows the symbol s17 set to the result of the StartCall operation performed with the value '1'. Line 536 shows the symbol {s18} set to the result of the CallI operation performed with the contents of the symbols s12 and {s18}. Line 538 shows the symbol s6 set to the result of the Ld_A operation performed using the contents of the symbol s19. A developer may alter any one of these lines of the IR code shown in view 506.

Figure 6:
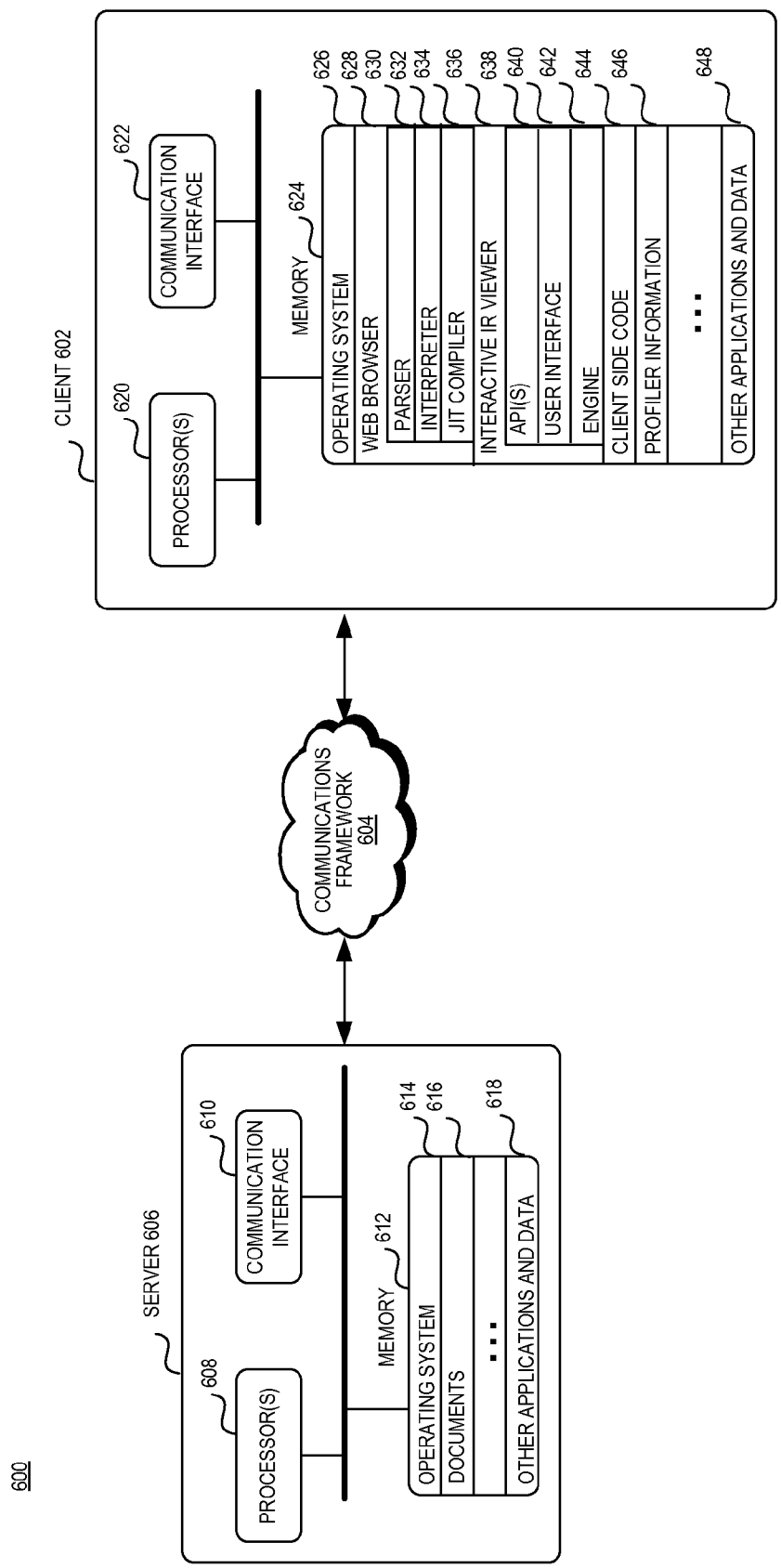
FIG. 6 is a block diagram of an exemplary operating environment.

Attention now turns to a discussion of an exemplary operating environment. FIG. 6 depicts one such exemplary operating environment 600. It should be noted that the operating environment 600 is exemplary and not intended to suggest any limitation as to the functionality of the embodiments. The embodiments may be applied to an operating environment 600 having one or more client(s) 602 in communication through a communications framework 604 with one or more server(s) 606. The operating environment 600 may be configured in a network environment, a distributed environment, a multiprocessor environment, or a stand-alone computing device having access to remote or local storage devices.

A client 602 may be embodied as a hardware device, a software module, or a combination thereof. The client 602 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof. The client 602 may also be embodied as a software module having instructions that execute in a single execution path, multiple concurrent execution paths (e.g., thread, process, etc.), or in any other manner.

A server 606 may be embodied as a hardware device, a software module, or as a combination thereof. The server 606 may be any type of electronic device capable of executing programmable instructions such as, without limitation, a mobile device, a personal digital assistant, a mobile computing device, a smart phone, a cellular telephone, a handheld computer, a server, a server array or server farm, a blade server, a web server, a network server, an Internet server, a work station, a mini-computer, a mainframe computer, a supercomputer, a network appliance, a web appliance, a distributed computing system, multiprocessor systems, or combination thereof. The server 606 may also be embodied as a software module having instructions that execute in a single execution path, multiple concurrent execution paths (e.g., thread, process, etc.), or in any other manner.

The communications framework 604 facilitates communications between the clients 602 and the servers 606. The communications framework 604 may embody any well-known communication techniques, such as techniques suitable for use with packet-switched networks (e.g., public networks such as the Internet, private networks such as enterprise intranet, and so forth), circuit-switched networks (e.g., the public switched telephone network), or a combination of packet-switched networks and circuit-switched networks (with suitable gateways and translators). A client 602 and a server 606 may include various types of standard communication elements designed to be interoperable with the communications framework 604, such as one or more communications interfaces, network interfaces, network interface cards, radios, wireless transmitters/receivers, wired and/or wireless communication media, physical connectors, and so forth. Examples of wired communications media may include a wire, cable, metal leads, printed circuit boards, backplanes, switch fabrics, semiconductor material, twisted-pair wire, coaxial cable, fiber optics, a propagated signal, and so forth. Examples of wireless communications media may include acoustic, radio frequency spectrum, infrared, and other wireless media.

The server 606 may include one or more processors 608, a communication interface 610, and a memory 612. A processor 608 may be any commercially available processor and may include dual microprocessors and multi-processor architectures. The communication interface 610 facilitates wired or wireless communications between the server 606 and other computing devices.

The memory 612 may be any computer-readable storage media that may store executable procedures, applications, and data. The computer-readable storage media does not pertain to propagated signals, such as modulated data signals transmitted through a carrier wave. It may be any type of memory device (e.g., random access memory, read-only memory, etc.), magnetic storage, volatile storage, non-volatile storage, optical storage, DVD, CD, floppy disk drive, and the like. The memory 612 may also include one or more external storage devices or remotely located storage devices. The memory 612 may contain instructions and data as follows:

an operating system 614;
one or more documents 616; and
various other applications and data 844.

The client 602 may include one or more processors 620, a communication interface 622, and a memory 624. A processor 620 may be any commercially available processor and may include dual microprocessors and multi-processor architectures. The communication interface 622 facilitates wired or wireless communications between the client 602 and other computing devices.

The memory 624 may be any computer-readable storage media that may store executable procedures, applications, and data. The computer-readable storage media does not pertain to propagated signals, such as modulated data signals transmitted through a carrier wave. It may be any type of memory device (e.g., random access memory, read-only memory, etc.), magnetic storage, volatile storage, non-volatile storage, optical storage, DVD, CD, floppy disk drive, and the like. The memory 624 may also include one or more external storage devices or remotely located storage devices. The memory 624 may contain instructions and data as follows:

an operating system 626;
a web browser 628 including a parser 630, an interpreter 632, and JIT compiler 634;
an interactive IR viewer 636 including one or more APIs 638, a user interface 640, and an engine 642;
client side code 644;
profiler information 646; and
various other applications and data 648.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method implemented on a computing device having at least one processor, the method comprising:
   executing client side code, the client side code written in a dynamic programming language; and
   during execution of the client side code:
      generating an intermediate representation of the client side code and profile data that is associated with commonly occurring patterns in the client side code; and
      displaying an intermediate representation corresponding to a user-selected portion of the client side code, the displayed intermediate representation based on an intermediate representation generated during execution of the client side code and the profile data.

2. The method of claim 1, wherein the client side code is executed in a web browser.

3. The method of claim 1, wherein the client side code is executed in an integrated development environment (IDE).

4. The method of claim 1, further comprising:
   modifying the displayed intermediate representation; and
   generating executable code using the modified intermediate representation.

5. The method of claim 4, further comprising:
   executing the executable code.

6. The method of claim 1, further comprising:
   requesting an intermediate representation associated with a select phase of a compilation of the client side code.

7. The method of claim 1, further comprising:
   requesting an intermediate representation associated with a select optimization of the intermediate representation.

8. A device, comprising:
   at least one processor and a memory; the at least one processor configured to:
   execute client side code, the client side code written in a dynamic programming language; and
   during execution of the client side code:
      generate an intermediate representation of the client side code and profile data that tracks frequent patterns in the client side code; and
      display an intermediate representation corresponding to a user-selected portion of the client side code, the displayed intermediate representation based on an intermediate representation generated during execution of the client side code and the profile data.

9. The device of claim 8, wherein the at least one processor is further configured to:
   modify the displayed intermediate representation; and
   generate executable code using the modified intermediate representation.

10. The device of claim 8, wherein the at least one processor is further configured to:
    execute the executable code.

11. The device of claim 8, wherein the at least one processor is further configured to:
    request an intermediate representation associated with a select phase of a compilation of the client side code.

12. The device of claim 8, wherein the at least one processor is further configured to:
    request an intermediate representation associated with a select optimization of the intermediate representation.

13. A system, comprising:
    at least one processor and a memory:
    the memory including:
    a just-in-time (JIT) compiler that generates an intermediate representation of client side code during execution of the client side code, the client side code written in a dynamic programming language;

an interpreter that interprets the client side code and generates profile data representing frequency of patterns in the client side code; and an interactive intermediate representation (IR); viewer that displays an intermediate representation corresponding to a user-selected portion of the client side code during execution of the client side code, the intermediate representation corresponding to the user-selected portion based on the intermediate representation generated during execution of the client side code and the profile data.

14. The system of claim 13, further comprising:

a web browser that executes the client side code.

15. The system of claim 13, further comprising:

an integrated development environment that executes the client side code.

16. The system of claim 13, further comprising:

a web application, other than a web browser, that executes the client side code.

17. The system of claim 13, further comprising:

a plurality of application programming interfaces (APIs) that exchange data between the interactive IR viewer and the JIT compiler.

18. The system of claim 13, further comprising:

a user interface that displays the intermediate representation corresponding to the user-selected portion and accepts modifications made to the intermediate representation corresponding to the user-selected portion.

19. The system of claim 18 wherein the JIT compiler receives the modified intermediate representation and uses the modified intermediate representation to generate executable code.

20. The system of claim 13, wherein the profile data is used to determine which portions of the client side code are to be JIT compiled.

* * * * *